Figures 1, 2:
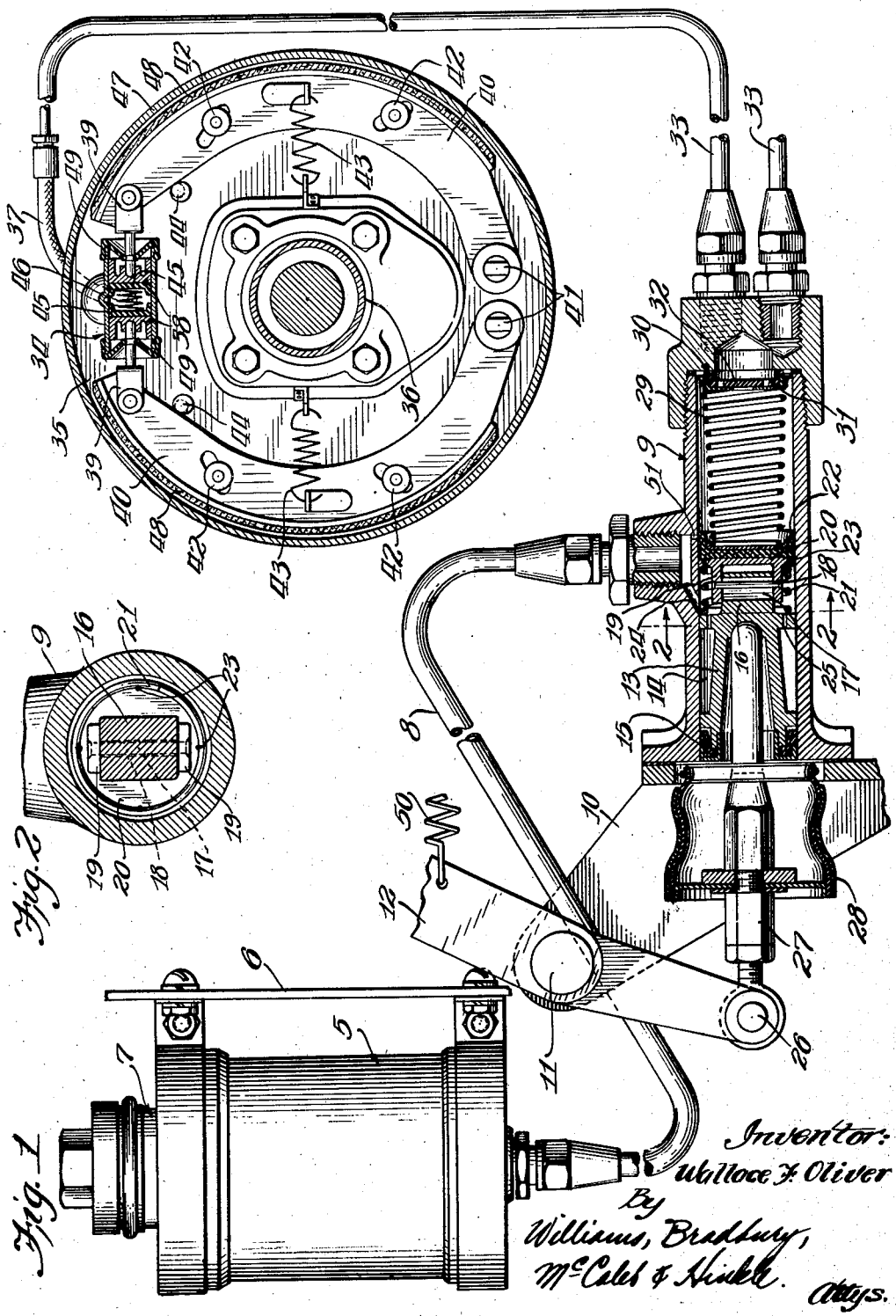

Sept. 22, 1936.　　W. F. OLIVER　　2,054,862

HYDRAULIC BRAKE

Filed Dec. 31, 1931

Inventor:
Wallace F. Oliver
By
Williams, Bradbury,
McCaleb & Hinkle
Attys.

Patented Sept. 22, 1936

2,054,862

UNITED STATES PATENT OFFICE 2,054,862

HYDRAULIC BRAKE

Wallace F. Oliver, Detroit, Mich., assignor to Hydraulic Brake Company, Detroit, Mich., a corporation of California Application December 31, 1931, Serial No. 584,038

8 Claims. (Cl. 188—152)

My invention relates to hydraulic brakes and is described as applied to the hydraulic brake system of an automotive vehicle, although it is equally adapted for use in hydraulic brakes applied to mechanisms other than automobiles.

In a hydraulic brake system it is of the utmost importance that the operating cylinders and conduits be maintained solidly filled with operating liquid, and that no air be present in the system. I have found that the best way to prevent air from getting into a hydraulic brake system is to maintain the operating parts thereof under super-atmospheric pressure. An object of this invention is to accomplish this result.

Another object is to provide mechanism for accomplishing this result which will be trouble-free and inexpensive to manufacture and assemble.

Another object is to provide mechanism which will maintain the operating parts of the system under super-atmospheric pressure but which will not interfere with the return of the brake shoes from operative to inoperative position.

Another object is to provide mechanism to maintain the operating parts of the system under super-atmospheric pressure without providing any additional joints or connections at which leakage might occur.

Other objects and advantages will be apparent as the description proceeds.

In the drawing,

Fig. 1 is a view showing the principal parts of a brake system, some of the parts being in section for easier understanding; and Fig. 2 is a view showing a detail of the construction of the compression cylinder and is taken on the line 2—2 of Fig. 1.

Referring to the drawing, I have indicated at 5 a fluid reservoir of suitable size which may be mounted on the dash 6 of an automobile. This reservoir is maintained under substantially atmospheric pressure, either by providing the upper end thereof with a small vent opening or preferably by providing a valve mechanism 7 similar to that disclosed in the application of Clarence V. Gardner, Serial No. 535,316, filed May 6, 1931, now Patent No. 1,889,857, dated December 6, 1932. The lower end of the reservoir 5 is connected to a pipe 8 leading to a compression cylinder 9 generally referred to in the trade as a "master cylinder." The master cylinder 9 is mounted on a bracket 10 affixed to the frame of the vehicle and which herein is shown as providing a pivot 11 for the brake operating lever 12 which may be operated either by the hand or foot of the driver or by power means, as desired.

The master cylinder 9 contains a sealing member 13 provided with an annular chamber 14 which is normally maintained full of fluid. The rear end of the sealing member 13 carries a flexible gasket 15 which assists in excluding air from the operating parts of the system. The forward end of the sealing member 13 is reduced, as indicated at 16, and is provided with a slot 17 in which is located a pin 18 affixed to the lugs 19 of a piston 20. The pin 18 and slot 17 provide a lost motion connection between the piston and the sealing member, and this lost motion connection is normally maintained in the position shown in the drawing by the relatively strong spring 21.

The forward face of the piston 20 is provided with a rubber cup washer 22 which, during the forward stroke of the piston, seals against the cylinder wall but which, on the return stroke of the piston, can collapse to permit flow of fluid therepast. To facilitate such flow, the cup 22 is provided with axial grooves in the periphery of its base portion and the piston 20 is provided with small bores 23. The space in back of the piston is maintained in communication with the pipe 8 by means of the port 24. The forward end of the sealing member 13 is likewise provided with openings 25 which maintain the chamber 14 in communication with the reservoir by way of the port 24 and pipe 8. The lower end of the actuating lever 12 is pivoted at 26 to a piston rod 27, having a rounded forward end which normally rests in a socket formed in the sealing member 13. There is no other connection between the piston rod 27 and the sealing member 13 so that a pull on the lever 12 in a backward direction will simply tend to separate the piston rod 27 from the sealing member 13 and will not exert a backward force on the piston 20. A flexible boot 28 is preferably provided to exclude dust and dirt from the cylinder mechanism.

A spring 29 serves to return the piston 20 to the position shown in Fig. 1 of the drawing. This spring 29 is weaker than the spring 21. One end of the spring 29 rests in a shallow metal cup located inside of the rubber cup washer 22 and the other end of the spring 29 rests against a valve mechanism 30 of the type claimed in the application of Erwin F. Loweke, Serial No. 337,122, filed February 2, 1929, now Patent No. 1,885,121, dated November 1, 1932. This valve mechanism need not be described in detail herein and it will suffice to say that it includes a metal plate 31 having a central opening through which passes the liquid discharged from the compression cylinder. Beyond the plate 31 is a rubber cup 32 having openings in its bottom which are out of line with the central opening in the plate 31. During the discharge of liquid from the compression cylinder the center of the cup 32 is flexed away from the plate 31 so that liquid may pass through the center opening of the plate, thence between the center of the plate and the center of the cup until it reaches the openings in the center of the cup, and thence through these openings. In order for liquid to return to the compression cylinder, the pressure on the liquid must be sufficient to move cup 32 and plate 31 away from the end of the cylinder and against the tension of the spring 29, whereupon the liquid can flow around the edges of the cup 32 and plate 31, and thence into the compression cylinder.

The discharge end of the compression cylinder is connected by conduits 33 with the motor cylinders which apply the brakes. These motor cylinders are most commonly located at the vehicle wheels and from such location are commonly referred to as "wheel cylinders", although it is obvious that the brake members and motor cylinders may be associated with the propeller shaft of the vehicle or the axles at points spaced from the wheels, or may be placed at any other suitable location. In Fig. 1 I have indicated at 34 such motor cylinder mounted on the pan 35 attached to the part 36 which may be either the axle housing, differential housing or torque tube of a vehicle. In order to accommodate the relative motion between the motor cylinder 34 and the compression cylinder 9, the conduit 33 is provided with a flexible portion, indicated at 37.

The motor cylinder 34 includes opposed pistons 38, each of which is connected by a link 39 with a brake shoe 40 pivoted at 41 to the pan 35. Guide means 42 are provided for the brake shoes 40, as are also the retracting springs 43 which normally hold the brake shoes 40 against suitable stops 44. The springs 43 are relatively strong springs which require a greater fluid pressure to overcome them than is required to overcome the spring 21.

Associated with the pistons 38 are flexible rubber cups 45 which are held against the faces of the pistons 38 by an interposed spring 46. The inner ends of the links 39 simply rest in sockets in the rear sides of the pistons 38 and when the stop members 44 are adjusted to position the shoes closer to the drum 47 to compensate for wear of the lining 48, the inner ends of the pins 39 simply move outwardly in their sockets without disturbing the pistons 38. This arrangement is advantageous as any outward pull on the pistons 38 might tend to draw air past the pistons and into the motor cylinder. Flexible caps 49 of rubber or other suitable material connect the ends of the motor cylinder 34 with the pins 39, and serve to exclude dirt and moisture from the motor cylinder.

In the normal condition of the brake system the parts are in the position shown in the drawing, and the cylinders 9 and 34, conduits 8 and 33, chamber 14, and space between the sealing member 13 and piston 20, are completely filled with fluid. The reservoir is also partially filled with fluid under substantially atmospheric pressure. The pressure on the fluid in the compression cylinder is dependent upon the difference in force exerted by the springs 21 and 29. In some instances it is unnecessary to use the valve mechanism 30, in which case the fluid in the conduits 33 and wheel cylinders 34 is under the same pressure as the fluid in the compression cylinder. In most instances, however, I find it desirable to interpose the valve mechanism 30 between the discharge end of the compression cylinder and the conduits 33, in which case the fluid in the conduits 33 and motor cylinders 34 is maintained at a pressure somewhat greater than the pressure maintained on the fluid in the compression cylinder. This difference in pressure is equal to the pressure necessary to move the valve mechanism 30 against the tension of the spring 29.

The sizes of and forces exerted by the several springs would, of course, be different for different installations, and for different operating conditions it might be desirable to maintain different pressures in different parts of the system. By way of illustration, however, I give the following example which would be suitable for certain classes of vehicles operated under certain conditions.

In this example, the springs 43 are of such size and strength that it requires a fluid pressure of approximately 50 pounds to move the brake shoes 40 against the tension of these springs. This means that when the brake is released, the springs 43 will move the pistons 38 in the motor cylinder 34 inwardly with sufficient force to create a pressure of slightly less than 50 pounds per square inch pressure on the fluid.

The spring 29 is made of such strength that a 5 pounds differential in fluid pressure must exist between the fluid on opposite sides of the valve mechanism 30 in order to move this valve mechanism away from its seat against the tension of the spring 29. The spring 21 is stronger than the spring 29 since the spring 21 must resist the thrust of the spring 29 and must have sufficient reserve to thrust the cup washer 22 across the port 51 and maintain the fluid in the compression cylinder under superatmospheric pressure. The spring 21 is made of sufficient force to maintain a fluid pressure of 5 pounds per square inch in the compression cylinder. Since the fluid in the compression cylinder is maintained at 5 pounds per square inch above atmospheric pressure and the spring 29 and valve mechanism 30 maintain the fluid in the conduits and wheel cylinders at five pounds above that existing in the compression cylinder, the fluid in the conduits and wheel cylinders is maintained at 10 pounds per square inch above atmospheric pressure.

When the actuating lever 12 is operated to apply the brakes, the sealing member 13 is moved toward the right, as shown in Fig. 1. Since the fluid in the compression cylinder is already at a pressure which balances the tension of the spring 21, the initial movement of the sealing member 13 will compress this spring and bring the sealing member into engagement with the piston 20, whereupon the piston will be moved toward the right, as viewed in Fig. 1, and will discharge fluid from the compression cylinder into the conduits 33. This discharge of fluid will actuate the motor cylinders 34 and cause the pistons thereof to move the brake shoes 40 into engagement with the brake drums 47. When the operator releases the lever 12, this lever is immediately returned to its initial position by a spring indicated at 50.

Since the pin 27 makes a separable connection with the sealing member 13, the return movement of the lever 12 and pin 27 does not tend to retract the sealing member 13 or piston 20. Immediately upon release of the force exerted on the lever 12, the springs 21 and 29 begin to expand. The expansion of the spring 21 separates the sealing member 13 and piston 20 as far as the lost motion connection therebetween will permit, and the expansion of the spring 29 returns the piston and sealing member to their original position which is the position shown in the drawing. At the same time the springs 43 are tending to contract and return the pistons in the motor cylinders to retracted position, but before these pistons can resume their retracted position a quantity of fluid must be discharged from each motor cylinder. The relatively long small bore conduits 33 and the valve mechanism 30 retard this return flow of fluid from the motor cylinders so that the piston 20 is usually returned faster than the fluid is returned to the compression cylinder from the conduits and motor cylinders. This condition creates a vacuum in the compression cylinder which draws in additional fluid from the rear of the piston through the openings 23 therein and around the periphery of the cup washer 22 which partially collapses during the return movement of the piston. The valve mechanism 30 prevents this vacuum from extending to the conduits and motor cylinders.

When the piston 20 reaches the position shown in Fig. 1 of the drawing, it momentarily comes to rest. As the pistons of the motor cylinders, under the influence of the springs 43, continue to return fluid to the conduits 33, the valve mechanism 30 is forced from its seat and fluid flows therepast from the conduits 33 into the compression cylinder. During the return stroke of the piston 20 additional fluid was drawn past the piston so that the compression cylinder, conduits 33, and motor cylinders, now contain more fluid than they can hold in a condition of rest. As the pistons of the motor cylinders continue to return, more and more fluid is returned to the compression cylinder and the piston 20 is forced backwardly against the tension of the spring 21 until the cup washer 22 uncovers the port 51 through which the excess of liquid may return to the reservoir. This excess of liquid carries with it any air which may have leaked into the compression cylinder, conduits 33 or motor cylinders 34, and thus these parts of the system are maintained free of air.

As soon as the pistons of the motor cylinders have completely returned to normal position and the excess of fluid has been returned to the reservoir, the valve mechanism 30 returns to its seat and the piston 20 is advanced under the influence of the spring 21 until the cup washer 22 closes the port 51. Thereafter the fluid in the compression cylinder, conduits 33, and motor cylinders 34, is maintained under super-atmospheric pressure.

While I have illustrated and described a particular embodiment of my invention, it is to be understood that my invention is not limited to this particular embodiment but may be incorporated in radically different structure and that the scope of my invention is limited solely by the following claims.

I claim:

1. In a hydraulic brake system of the class described, a motor cylinder, brake means actuated thereby, return spring means for said brake means, a compression cylinder, a reservoir for supplying fluid to said compression cylinder, a conduit connecting said cylinders, valve means interposed between said compression cylinder and said conduit, a spring acting on said valve means to maintain pressure in said conduit and motor cylinder, and means other than gravity to maintain said compression cylinder under a pressure greater than that existing in the reservoir.

2. In a hydraulic system of the class described, the combination of a compressor for discharging fluid under pressure, a conduit connected to said compressor, mechanism associated with said conduit and operable responsive to compression and decompression of fluid therein, a fluid reservoir under atmospheric pressure, means other than said reservoir for maintaining the fluid in said compressor, conduit and mechanism under superatmospheric pressure, means for automatically withdrawing an excess quantity of liquid from said reservoir and forcing it into that part of the system maintained under superatmospheric pressure by said other means, and means for automatically returning excess fluid from said last-named part of the system to said reservoir.

3. A hydraulic brake system of the class described comprising a motor cylinder, braking means actuated thereby, return spring mechanism for said braking means, a compression cylinder, a piston therein, a conduit connecting said cylinders, said cylinders and conduit being filled with fluid, valve means interposed between said compression cylinder and said conduit for maintaining the fluid in said conduit and motor cylinder under a greater pressure than the fluid in said compression cylinder, and a fluid reservoir constituting a source of supply for said compression cylinder, said piston constituting valve means interposed between said compression cylinder and said reservoir for maintaining the fluid in said compression cylinder under a pressure greater than that existing in said reservoir.

4. In a hydraulic brake system of the class described, the combination of brake elements adapted to be moved into engagement with brake drums, a motor cylinder for moving said brake elements into engagement with said drums, a compression cylinder for creating pressure to actuate said motor cylinder, a piston in said compression cylinder, a conduit connecting said cylinders, a fluid reservoir forming a source of supply for said compression cylinder, said piston constituting valve means between said reservoir and said compression cylinder capable of maintaining a predetermined pressure in said cylinders and conduit, a second valve means between said compression cylinder and said conduit for increasing the pressure in said conduit and motor cylinder, and retractile means for said brake elements capable of returning fluid to said reservoir past said valves.

5. In a hydraulic brake system of the class described, the combination of a compression cylinder for discharging fluid under pressure, a conduit connected to said compressor, brake mechanism associated with said conduit and operable responsive to compression and decompression of the fluid therein, a fluid reservoir under substantially atmospheric pressure, resilient means independent of said reservoir for maintaining the fluid in said compressor, conduit and mechanism under super-atmospheric pressure, means for automatically withdrawing an excess quantity of fluid from said reservoir and forcing it into that part of the system maintained under super-atmospheric pressure by said resilient means, and means for automatically returning excess fluid from said last-named part of the system to said reservoir.

6. In brake mechanism of the class described, a compression cylinder having one end exposed to atmosphere, a piston therein, a flexible packing member for said piston, said piston having openings therethrough, a sealing member engaging said piston, said sealing member serving to exclude atmospheric air from said cylinder and to prevent leakage of fluid therefrom, a lost motion connection between said sealing member and said piston, said sealing member and said piston being of the same diameter, a spring acting to separate said sealing member and said piston, actuating mechanism engaging said sealing member, and a fluid reservoir communicating with said sealing member and the rear of said piston.

7. In a hydraulic system of the class described, a motor cylinder, means operated thereby, return springs for said means, a compression cylinder having one end exposed to atmosphere, a conduit connecting said cylinders, a piston in said compression cylinder, a sealing member adjacent said piston and of the same diameter as said piston, said sealing member serving to exclude atmospheric air from said compression cylinder and to prevent leakage of fluid therefrom, said piston and sealing member providing a space therebetween, means for varying said space, and a reservoir communicating with said space.

8. In brake mechanism of the class described, the combination of a motor cylinder, brake means operated thereby, return springs for said brake means, a compression cylinder having one end exposed to atmosphere, a conduit connecting said cylinders, a piston in said compression cylinder, a sealing member in rear of said piston and movable with respect thereto, said sealing member providing an annular fluid chamber and serving to exclude atmospheric air from said cylinder and to prevent leakage of fluid therefrom, said piston provided with openings to permit flow of fluid therepast on the return stroke, a fluid reservoir, connections from said reservoir to said chamber and the rear of said piston, a port for connecting said reservoir with the cylinder in front of said piston, and means normally maintaining said piston in a position closing said port.

WALLACE F. OLIVER.